United States Patent
Lönnberg et al.

(10) Patent No.: US 11,596,979 B2
(45) Date of Patent: Mar. 7, 2023

(54) PIEZO HAPTIC FEEDBACK DEVICE WITH INTEGRATED SUPPORT

(71) Applicant: Aito BV, Amsterdam (NL)

(72) Inventors: Jockum Lönnberg, Amsterdam (NL); Job Greefhorst, Utrecht (NL); Rene De Vries, Zaandam (NL)

(73) Assignee: Aito BV, Amsterdam (NL)

( * ) Notice: Subject to any disclaimer, the term of this patent is extended or adjusted under 35 U.S.C. 154(b) by 343 days.

(21) Appl. No.: 16/649,498

(22) PCT Filed: Sep. 27, 2018

(86) PCT No.: PCT/EP2018/076203
§ 371 (c)(1),
(2) Date: Mar. 20, 2020

(87) PCT Pub. No.: WO2019/068540
PCT Pub. Date: Apr. 11, 2019

(65) Prior Publication Data
US 2020/0306797 A1    Oct. 1, 2020

(30) Foreign Application Priority Data

Oct. 3, 2017  (FI) .................................... 20175872

(51) Int. Cl.
*B06B 1/06* (2006.01)
*G06F 3/01* (2006.01)

(52) U.S. Cl.
CPC ............ *B06B 1/0603* (2013.01); *G06F 3/016* (2013.01)

(58) Field of Classification Search
CPC ..... B06B 1/0603; B06B 1/0651; G06F 3/016; H01L 41/0533; H01L 41/0825; H01L 41/0973; H01L 41/22
See application file for complete search history.

(56) References Cited

U.S. PATENT DOCUMENTS 8,427,441 B2 * 4/2013 Paleczny ................. G06F 3/016
345/173
9,287,488 B2 * 3/2016 Hiraoka ................ H01L 41/042
(Continued)

FOREIGN PATENT DOCUMENTS

CA        2733375 A1    10/2011
CN      104396040 A     3/2015
(Continued)

OTHER PUBLICATIONS

International Search Report for corresponding International Patent Application No. PCT/EP2018/076203 dated Dec. 11, 2018, 4 pages.
(Continued)

*Primary Examiner* — Ian J Lobo
(74) *Attorney, Agent, or Firm* — Merchant & Gould

(57) ABSTRACT

According to an embodiment, a device comprises: a piezoelectric element configured to convert an electrical voltage into a mechanical strain; and a conductive base plate onto which the piezoelectric element is fastened, wherein the conductive base plate comprises an integrated support positioned on an underside of the conductive base plate, wherein the conductive base plate is supported by the integrated support; wherein the device is configured to provide haptic feedback on a basis of the mechanical strain.

13 Claims, 9 Drawing Sheets

(56) References Cited

U.S. PATENT DOCUMENTS

| | | |
|---|---|---|
| 2007/0080951 A1 | 4/2007 | Maruyama et al. |
| 2010/0038998 A1 | 2/2010 | Onishi et al. |
| 2010/0053087 A1 | 3/2010 | Dai et al. |
| 2011/0050406 A1* | 3/2011 | Hennig .................. G06F 3/016 340/407.2 |
| 2012/0038470 A1 | 2/2012 | Kim et al. |
| 2012/0075198 A1 | 3/2012 | Sulem et al. |
| 2013/0086997 A1 | 4/2013 | Tanhua et al. |
| 2013/0106239 A1 | 5/2013 | Yun et al. |
| 2014/0306914 A1 | 10/2014 | Kagayama |
| 2014/0339958 A1 | 11/2014 | Park et al. |
| 2015/0091414 A1* | 4/2015 | Lonnberg ................ G06F 3/016 310/330 |
| 2015/0102947 A1 | 4/2015 | Chung et al. |
| 2017/0010707 A1 | 1/2017 | Son |
| 2017/0155038 A1 | 6/2017 | Caraveo et al. |
| 2018/0321749 A1 | 11/2018 | Takeda et al. |

FOREIGN PATENT DOCUMENTS

| | | |
|---|---|---|
| EP | 2 381 338 A1 | 10/2011 |
| EP | 2414913 A2 | 2/2012 |
| EP | 2 662 909 A1 | 11/2013 |
| KR | 10-2015-0045959 A | 4/2015 |
| WO | 2014137103 A1 | 9/2014 |
| WO | WO 2017/081868 A1 | 5/2017 |

OTHER PUBLICATIONS

Written Opinion of the International Searching Authority for corresponding International Patent Application No. PCT/EP2018/076203 dated Dec. 11, 2018, 9 pages.

Finnish Search Report for corresponding Finnish Patent Application No. 20175872 dated Jan. 22, 2018, 2 pages.

Chinese Office Action dated Dec. 27, 2022 for corresponding Chinese Application No. 201880064917.4 (9 pages).

* cited by examiner

PIEZO HAPTIC FEEDBACK DEVICE WITH INTEGRATED SUPPORT

This application is a National Stage Application of PCT/EP2018/076203, filed 27 Sep. 2018, which claims benefit of Patent Application Ser. No. 20175872, filed 3 Oct. 2017 in Finland and which applications are incorporated herein by reference. To the extent appropriate, a claim of priority is made to each of the above disclosed applications.

TECHNICAL FIELD

The present invention relates generally to touch user interfaces of electronic equipment and more specifically it relates to a piezoelectric device with haptic feedback.

BACKGROUND

One objective of haptics may be to provide tactile feedback to the user of a device. One of the most well-known examples of this is the vibrational feedback, for example, in modern cell phones. Traditionally, this functionality has been implemented using inertial haptic actuators, the operation principle of which is based on the movement of a mechanical mass. Recently, the application of piezoelectricity for haptic feedback has become more common through piezoelectric actuators. When a voltage is applied over a piezoelectric material, a strain is induced into the material. The same applies also vice versa: when an applied stress induces strain in a piezoelectric material, a voltage can be detected over the material.

A piezoelectric haptic feedback device is typically implemented by fastening a piezoelectric element onto a conductive base plate. When a voltage is applied over the piezoelectric element, the induced strain bends both the element and the base plate. When this voltage is modulated in an appropriate fashion, haptic feedback is produced through motion of the piezoelectric element and the base plate. Additionally, if any strain is induced into the piezoelectric element when, for example, a user presses onto the device, the resulting voltage can be detected.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a piezoelectric haptic feedback device structure. The object is achieved by the features of the independent claims. Some embodiments are described in the dependent claims.

According to a first aspect, a device comprises: a piezoelectric element configured to convert an electrical voltage into a mechanical strain; and a conductive base plate onto which the piezoelectric element is fastened, wherein the conductive base plate comprises an integrated support positioned on an underside of the conductive base plate, wherein the conductive base plate is supported by the integrated support; wherein the device is configured to provide haptic feedback on a basis of the mechanical strain. The integrated support permits the piezoelectric element and the conductive base plate to bend enough for haptic feedback while simultaneously preventing over bending of the piezoelectric element.

In an implementation of the first aspect, the integrated support is formed into the conductive base plate by punching or by bending edges of the conductive base plate. This allows precise manufacturing of the integrated support so that the integrated support prevents over bending of the piezoelectric element, while still permitting sufficient motion for haptic feedback.

In another implementation of the first aspect, the integrated support is formed by fastening an additional structure or structures on an underside of the conductive base plate, which allows the integrated support to be manufactured separately from the base plate.

In another implementation of the first aspect, the mechanical strain caused by the voltage bends the piezoelectric element and the conductive base plate. When this bending is modulated, motion for the haptic feedback is generated.

In another implementation of the first aspect, an electrode is fastened to a top surface of the piezoelectric element. This allows the same voltage to be applied over the whole cross section of the piezoelectric element.

In another implementation of the first aspect, the conductive base plate is configured as a lower electrode of the piezoelectric element, which allows a voltage to be applied over the whole cross section of the piezoelectric element.

In another implementation of the first aspect, the piezoelectric element comprises multiple piezoelectric layers configured electrically either in series or in parallel, which allows lower voltages to be used to achieve the same amount of bending.

In another implementation of the first aspect, the piezoelectric element or the conductive base plate is a circular or an oval disk, which allows the piezoelectric element and the base plate to bend efficiently in the centre.

In another implementation of the first aspect, the piezoelectric element or the conductive base plate is a polygon shaped disk, which may make manufacturing of the base plate easier.

In another implementation of the first aspect, the integrated support is positioned on an outer circumference of the conductive base plate to allow the piezoelectric element and the conductive base plate to bend considerably in the centre.

In another implementation of the first aspect, the piezoelectric element is configured to convert mechanical strain into electrical voltage to detect touch. This allows the same structure to also be used for both haptic feedback and touch sensing.

In another implementation of the first aspect, the piezoelectric element and the conductive base plate are electrically connected to a conductive film, which allows the voltage to be controlled using the conductive film.

In another implementation of the first aspect, the device is positioned in a hermetically sealed cavity, which reduces amount of noise produced by the device and prevents any liquids from corroding the internals of the device or causing a short circuit.

In another implementation of the first aspect, height of the integrated support is configured to allow 10-200 micrometre, µm, pre-bending of the piezoelectric element, 10-200 µm haptic movement of the piezoelectric element, and 1-200 µm movement of the piezoelectric element due to touch. These measurements are sufficient to ensure that both haptic feedback and touch sensing function properly.

In another implementation of the first aspect, height of the integrated support is configured so that maximum total bending of the piezoelectric element is limited to a chosen value in a range 200-500 μm. This ensures that the piezoelectric element does not break due to bending.

In another implementation of the first aspect, the integrated support is configured on a same side than the piezoelectric element. A conductive base plate may be positioned appropriately during the manufacturing process. The manufacturing process may be accordingly more convenient. Less parts may be required for the structure. Furthermore, the product and the process may require less costs. For example, the piezoelectric element may be assembled in the same process as other components on the PCB. Heat load for piezoelectric element may be accurately controlled during manufacturing process, consequently the reliability of the component is better, for example having less silver migration or other failure modes. Robustness of the structure may be improved, for example impact resistance.

In another implementation of the first aspect, the integrated support is configured to be conductive. The integrated support also electrically connects the conductive base plate to a conductive foil of the device stack.

In another implementation of the first aspect, the integrated support is configured to be elastic to connect to a portion of a conductive base layer, onto which conductive base layer the piezoelectric element is configured to be soldered. Consequently, appropriate height of the integrated support may be adjustable to match with a height of the combination of the piezoelectric element and a solder. This may also improve the manufacturing process.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

Figure 1:
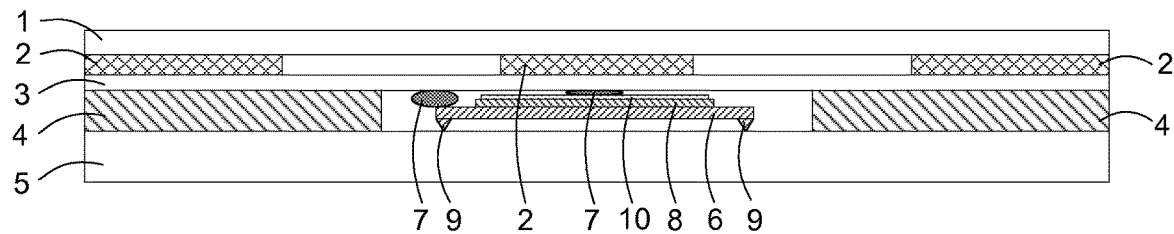
FIG. 1 illustrates a schematic representation of a cross section side view of a device when no external strain or voltage is applied according to an embodiment.

The detailed description provided below in connection with the appended drawings is intended as a description of the embodiments and is not intended to represent the only forms in which the embodiment may be constructed or utilized. However, the same or equivalent functions and structures may be accomplished by different embodiments.

According to an embodiment, a piezoelectric touch device comprises a piezoelectric element, a conductive base plate, a carrier layer, a spacer, a conductive foil, an overlay layer, and a top electrode. The conductive base plate further comprises an integrated support. The top electrode is fastened onto the piezoelectric element, the piezoelectric element is fastened onto the conductive base plate, and the base plate lays on the carrier layer supported by the integrated support positioned on the underside of the conductive base plate. Furthermore, the piezoelectric element can comprise one or more piezoelectric layers electrically configured either in series or in parallel.

When a voltage is applied between the top electrode and the conductive base plate, a strain is induced into the piezoelectric element, the piezoelectric element, the top electrode, and the conductive base plate bend due to the strain while being supported by the integrated support. The required voltage can be reduced by using a piezoelectric element with multiple layers. When the voltage is modulated, bending of the piezoelectric element and the base plate can be converted into, for example, vibrational motion. Amplitude, frequency, and duration of the motion can be precisely controlled with the voltage. Thus, haptic feedback is generated.

Due to the lack of an inertial mass, the device can be significantly smaller and the haptic feedback can be engineered with higher precision than with inertial haptic actuators. This precision allows haptic feedback of the device to, for example, emulate the sensation of a click of a button without a mechanical moving button.

Alternatively or in addition to haptic feedback, the piezoelectric element and the conductive support plate can be bent by a force applied onto the device, which can be detected as a voltage between the support plate and the top electrode due to strain induced into the piezoelectric element by the force. Thus, the device can be configured to only provide haptic feedback, to only sense touch, or to do both.

Since piezoelectric materials usually have a brittle crystalline structure, maximum bending of the piezoelectric element should be limited in order to prevent the element from breaking. Height of the integrated support is such that bottom surface of the conductive base plate hits the carrier layer before over bending of the piezoelectric element can occur. The height of the integrated support can be manufactured with such precise tolerances that sufficient movement for haptic feedback and touch sensing is possible at the same time with the limited bending. The integrated support can be precisely manufactured cost-effectively by, for example, punching of the base plate, or by bending edges of the base plate. Additionally, the carrier layer can be flat, which further simplifies manufacturing.

Moving parts of the device are positioned in a cavity, which significantly reduces the amount of noise produced by the device. Furthermore, by controlling and minimizing the contact point between the base plate and the carrier layer, produced noise can be reduced even further. Additionally, the cavity can be hermetically sealed, which prevents liquids from getting into the device and causing corrosion or short circuits.

FIG. 1 illustrates a schematic representation of a cross section side view of a piezoelectric device when no voltage or strain is applied to the device according to an embodiment. The device can be configured to provide haptic feedback, touch sensing, or both. The figure shows an overlay layer 1, a top adhesive 2, a conductive foil 3, a spacer layer 4, a carrier layer 5, a conductive base plate 6, silver glue 7, a piezoelectric element 8, an integrated support 9, and a top electrode 10.

Since there is no voltage or strain applied to the device, the piezoelectric layer 8 and the conductive base plate 6 are not bent. Layers on top of the top electrode 10, for example the overlay layer 1, the top adhesive 2, and the conductive foil 3, do not induce strain onto the piezoelectric element 8, because they are supported by the spacer layer 4. Both the top electrode 10 and the base plate 6 are electrically connected to the conductive foil 3 through the silver glue 7. Thus, the conductive base plate 6 is configured as a lower electrode for the piezoelectric element 8. Therefore, a voltage can be applied over the piezoelectric element using the conductive foil 3, or a voltage can be measured from the conductive foil 3 if a strain is induced into the piezoelectric element 8.

When a voltage is applied to the device, some parts, for example the top electrode 10, the piezoelectric element 8, the conducive base plate 6, and the integrated support 9, move. Since these parts are positioned in a cavity formed by the carrier layer 5, the overlay layer 1, and the spacer layer 4, they can be efficiently isolated from the surroundings of the device. Thus, noise produced by the moving parts inside the device can be significantly reduced. Furthermore, if the cavity is hermetically sealed, the moving parts are also effectively isolated from possible liquids outside the device that could cause corrosion or a short circuit.

It should be appreciated that the conductive base plate 6 can be of many different shapes, such as, circular, oval, triangular, square, or any other polygon. The same applies for the piezoelectric element 8 and the top electrode 10. Furthermore, neither the piezoelectric element 8 nor the top electrode 10 needs to have the same shape as the conductive base plate 6. Similarly, the integrated support 9 can be implemented in various different ways, such as, by punching or by bending edges of the base plate 6, or by fastening additional material to the base plate 6. Furthermore, the integrated support 9 can comprise multiple feet, formed by for example the aforementioned punching method, or it can be a single unitary support structure.

Figure 2:
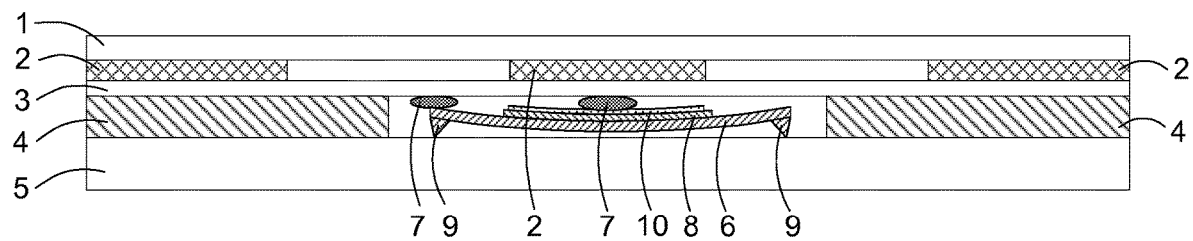
FIG. 2 illustrates a schematic representation of a cross section side view of a device when either external strain is applied or when voltage over the piezoelectric element causes strain according to an embodiment.

FIG. 2 illustrates a schematic representation of a cross section side view of a piezoelectric device when a voltage is applied to the device according to an embodiment. Due to the voltage applied over the piezoelectric element 8, a strain is induced into the element 8, which causes the piezoelectric element 8, the top electrode 10, and the conductive base plate 6 to bend. Even while bent, the base plate 6 and the top electrode 10 are still in electrical contact with the conductive foil 3 through the silver glue 7. Thus, the applied voltage can be maintained under bending. Since the base plate 6 is supported by the integrated support 9, the piezoelectric element 8 and the base plate 6 can bend without bottom of the base plate 6 touching the carrier layer 5.

Figure 3:
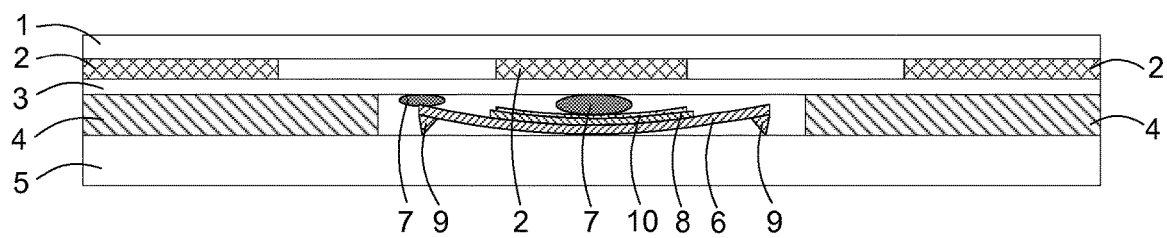
FIG. 3 illustrates a schematic representation of a cross section side view of a device, when the conductive base plate is under maximum strain and further bending is prevented by the supporting layer according to an embodiment.

FIG. 3 illustrates a schematic representation of a cross section side view of a piezoelectric device when a voltage is applied to the device according to an embodiment. Now the applied voltage is high enough that the bending of the piezoelectric element 8, the top electrode 10, and the conductive base plate 6 causes bottom of the base plate 6 to touch the carrier layer 5. Due to this, the piezoelectric element 8 or the base plate 6 cannot bend any further.

Height of the integrated support 9 is configured in such a way that this limited maximum bending prevents over bending of the piezoelectric element 8. The maximum allowed bend of the piezoelectric element can be, for example, some chosen value in the range 200-500 micrometres ($\mu m$), or it may be in some subrange of this, such as, 250-400 $\mu m$ or 300-470 $\mu m$. At the same time, the height must also be such that sufficient bending for haptic feedback and touch sensing is allowed.

In addition to bending due to touch and haptic feedback, the device can be bent even when no external force or voltage is applied. This is referred to as pre-bending. Bending due to touch can be in the range 1-200 $\mu m$, or it may be in some subrange of this, such as 5-120 $\mu m$ or 30-180 $\mu m$. Bending due to haptic movement may be in the range 10-200

μm, or it may be in some subrange of this, such as 30-170 μm or 50-190 μm. Bending due to pre-bending can be in the range 10-200 μm, or it may be in some subrange of this, such as 20-190 μm or 60-100 μm. Furthermore, the carrier layer can be flat, because the amount of bending is defined by the integrated support, which simplifies manufacturing. Also the contact point between the base plate and the carrier layer can be minimized and controlled, which further reduces the amount of noise produced by the device. Additionally, the base plate 6 and the top electrode 10 are still in electrical contact with the conductive foil 3 through the silver glue 7 even under maximum bending.

When the device is used for haptic feedback, an alternating voltage is applied between the top electrode 10 and the conductive base plate 6. Due to the changing voltage, the piezoelectric element 8, the top electrode 10, and the conductive base plate 6 continuously bend and relax. Thus, the device rapidly changes state between those depicted in FIGS. 1, 2, and 3 as the bending follows the voltage. As a result, a motion for haptics is induced. During this motion, the precise manufacturing of the integrated support 9 protects the piezoelectric element from over bending in the same fashion as with the static case described above. Alternatively or in addition to an alternating voltage, haptic feedback can also be generated with a single voltage pulse, where the feedback is controlled with shape of the pulse. In this case, the device cycles through the states depicted in FIGS. 1-3 once. This type of feedback can be used to, for example, emulate click of a physical button. Also in this case, the piezoelectric element 8 is protected from over bending by the precise manufacturing of the integrated support 9.

Figure 4:
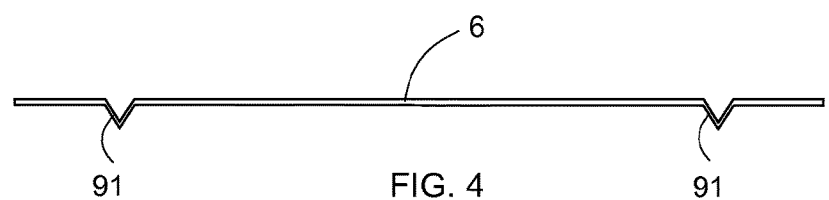
FIG. 4 illustrates a schematic representation of a cross section side view of a conductive base plate with feet produced using punching.

FIG. 4 illustrates cross section side view of a schematic representation of a conductive base plate 6 showing the base plate 6 and an integrated support. The integrated support has been produced by punching, which results in feet 91 on the underside of the base plate 6 as some of the base plate material bens downwards.

Figure 5:
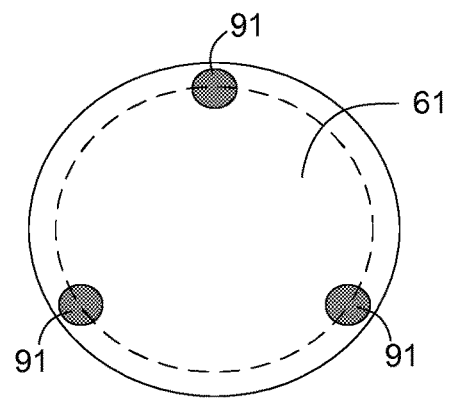
FIGS. 5 and 6 illustrate top and side views, respectively, of a schematic representation of a circular conductive base plate comprising three feet produced using punching according to an embodiment.
Figure 6:
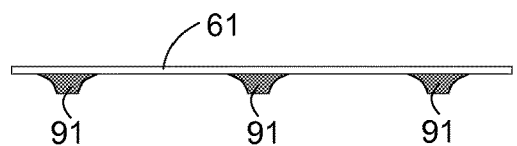

FIGS. 5 and 6 illustrate top and side views, respectively, of a schematic representation of a circular conductive base plate according to an embodiment showing a circular conductive base plate 61 and three feet 91 produced using punching. The feet 91 are configured to function as the integrated support 9. The piezoelectric element 8, which is not depicted in the figures, would be fastened to top side of the base plate 61, that is, on the opposite side from the feet 91.

The feet 91 are positioned on an outer circumference of the conductive base plate 61 as illustrated by the dashed line on the conductive base plate 61, and the feet 91 form an integrated support for the base plate. Due to this positioning of the feet 91, the conductive base plate 61 and the attached piezoelectric element 8 can freely bend in the centre area of the base plate 91. The punching process allows the feet 91 to be easily manufactured with precise tolerances, which ensures that height of the feet 91 is such that sufficient movement of the conductive base plate 91 and the piezoelectric element 8 is permitted for haptic feedback and touch sensing, while over bending is prevented in order to protect the piezoelectric element 8 from breaking.

Figure 7:
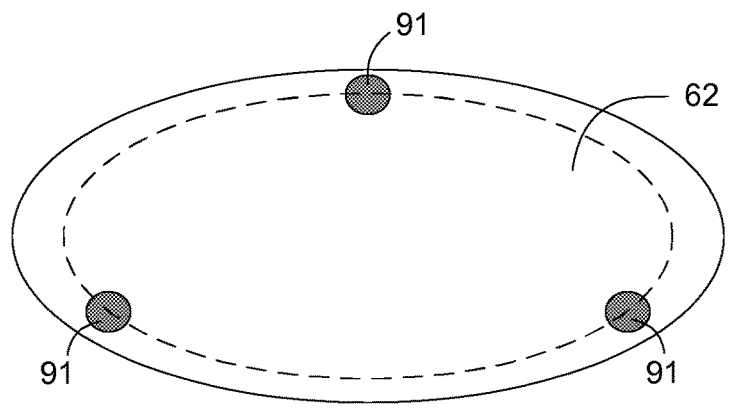
FIGS. 7 and 8 illustrate top and side views, respectively, of a schematic representation of an oval conductive base plate comprising three feet produced using punching according to an embodiment.
Figure 8:
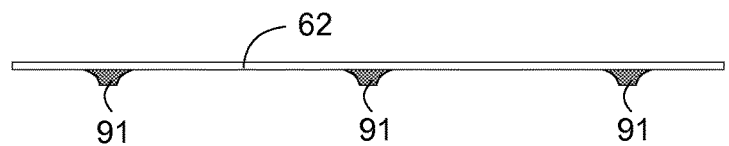

FIGS. 7 and 8 illustrate top and side views, respectively, of a schematic representation of an oval conductive base plate according to an embodiment showing an oval conductive base plate 62 and three feet 91 produced using punching. The piezoelectric element 8, which is not depicted in the figures, would be fastened to top side of the base plate 62.

Figure 9:
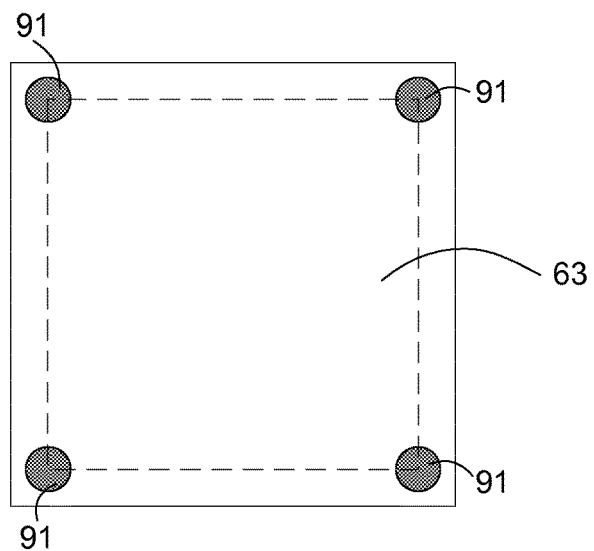
FIGS. 9 and 10 illustrate top and side views, respectively, of a schematic representation of a square conductive base plate comprising four feet produced using punching according to an embodiment.
Figure 10:
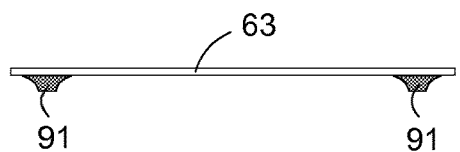

FIGS. 9 and 10 illustrate top and side views, respectively, of a schematic representation of a square conductive base plate according to an embodiment showing a square conductive base plate 63 and four feet 91 produced using punching. The piezoelectric element 8, which is not depicted in the figures, would be fastened to top side of the base plate 63.

Figure 11:
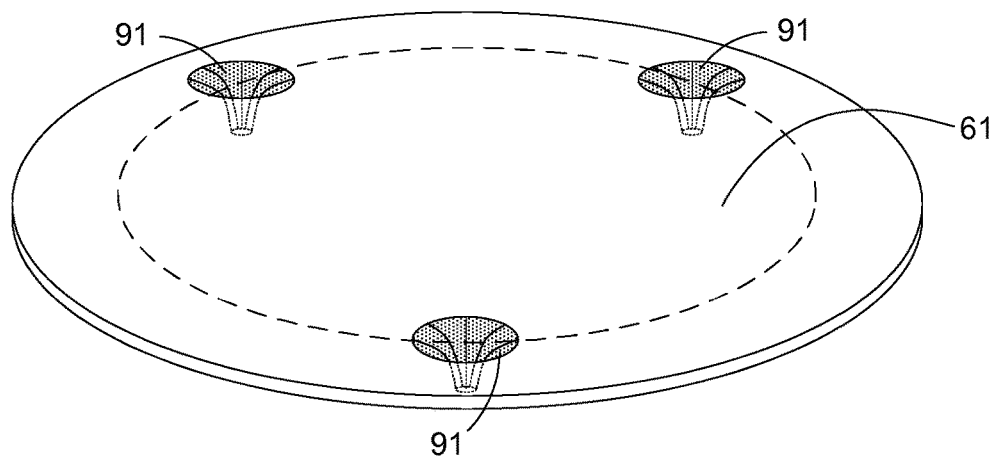
FIG. 11 illustrates a perspective view of a schematic representation of a circular conductive base plate comprising three feet produced using punching according to an embodiment.

FIG. 11 illustrates a perspective view of a schematic representation of a circular conductive base plate 61 comprising three feet 91 produced using punching according to an embodiment. The feet 91 are positioned symmetrically on an outer circumference of the base plate 61 as indicated by a dashed line on top of the base plate 61.

Figure 12:
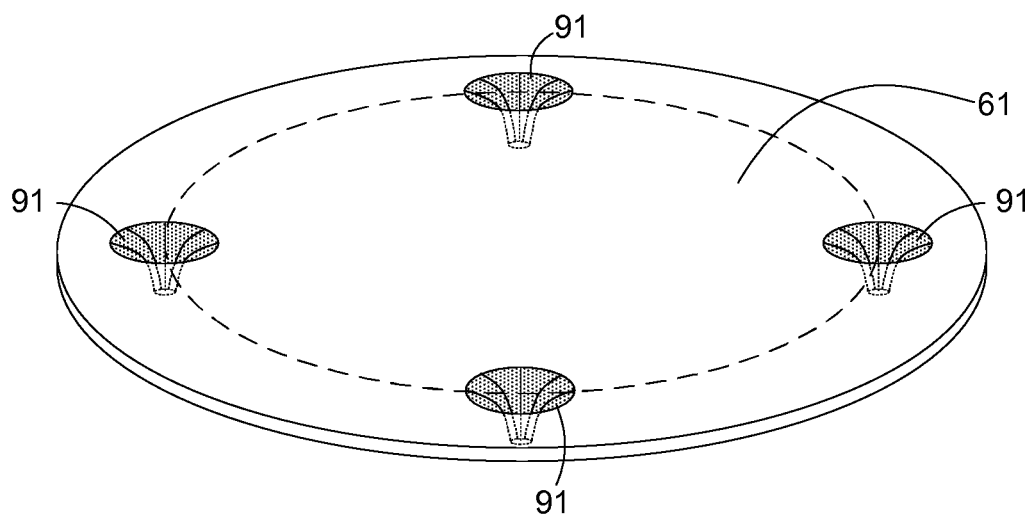
FIG. 12 illustrates a perspective view of a schematic representation of a circular conductive base plate comprising four feet produced using punching according to an embodiment.

FIG. 12 illustrates a perspective view of a schematic representation of a circular conductive base plate 61 comprising four feet 91 produced using punching according to an embodiment. The feet 91 are positioned symmetrically on an outer circumference of the base plate 61 as indicated by a dashed line on top of the base plate 61.

Figure 13:
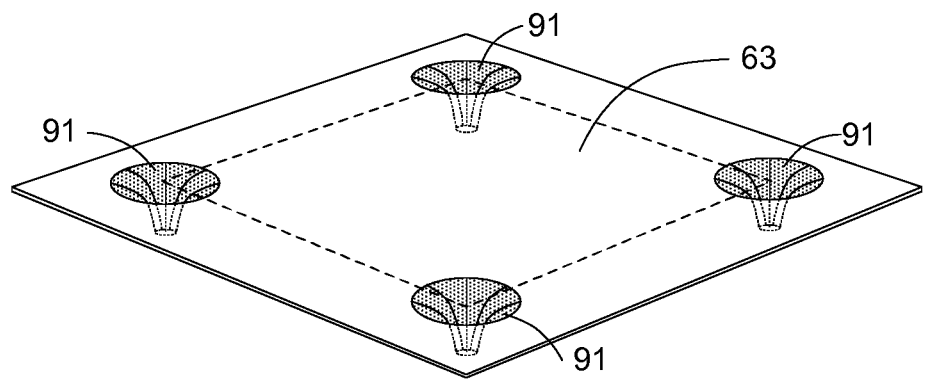
FIG. 13 illustrates a perspective view of a schematic representation of a square conductive base plate comprising four feet produced using punching according to an embodiment.

FIG. 13 illustrates a perspective view of a schematic representation of a square conductive base plate 63 comprising four feet 91 produced using punching according to an embodiment. The feet 91 are positioned symmetrically close to corners of the base plate 63 as indicated by a dashed line in the figure.

Although, according to the description above, the integrated supports presented in FIGS. 4-12 were manufactured by forming feet using punching, similar support structures can also be achieved using other methods. For example, the feet can be manufactured separately from the conductive base plate and then attached to the base plate using, for example, an adhesive or by welding. Furthermore, in the aforementioned figures, the feet were depicted to resemble those produced with punching. If the feet are manufactured with some other method, their shape does not need to follow depictions presented in the figures, but can be of various different shapes.

Figure 14:
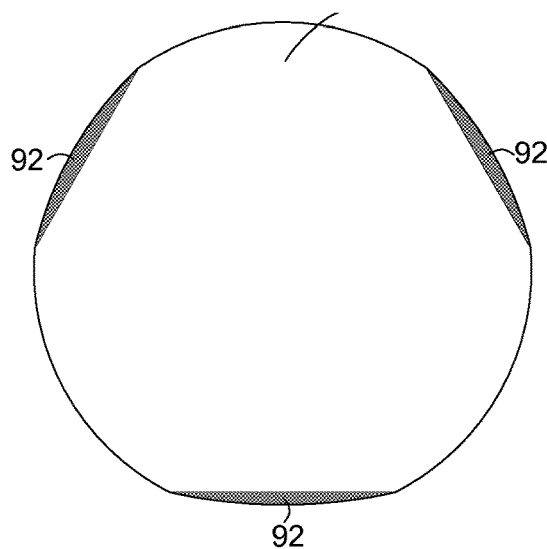
FIGS. 14 and 15 illustrate top and side views, respectively, of a schematic representation of a circular conductive base plate comprising three feet produced by bending edges of the conductive base plate according to an embodiment.
Figure 15:
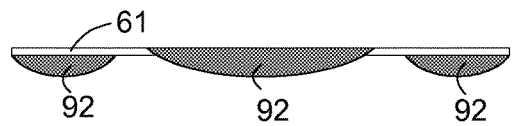

FIGS. 14 and 15 illustrate top and side views, respectively, of a schematic representation of a circular conductive base plate 61 comprising three symmetrically positioned feet 92 produced by bending edges of the base plate 61 according to an embodiment. The feet 92 are configured to function as the integrated support 9. The piezoelectric element 8, which is not depicted in the figures, would be fastened to top side of the base plate 61. Height of the bent edges 92 is configured to be such that over bending of the piezoelectric element 8 is prevented while still permitting sufficient movement for haptic feedback and touch sensing.

Figure 16:
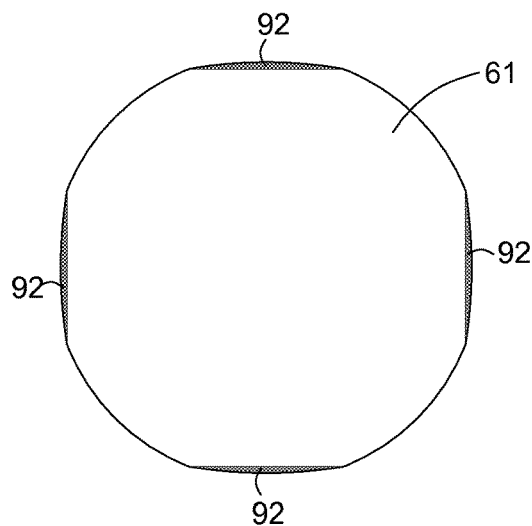
FIGS. 16 and 17 illustrate top and side views, respectively, of a schematic representation of a circular conductive base plate comprising four feet produced by bending edges of the conductive base plate according to an embodiment.
Figure 17:
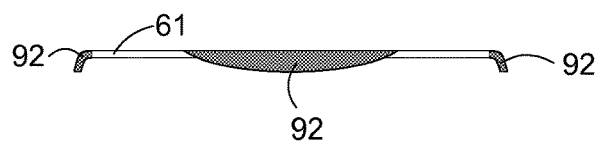

FIGS. 16 and 17 illustrate top and side views, respectively, of a schematic representation of a circular conductive base plate 61 comprising four symmetrically positioned feet 92 produced by bending edges of the base plate 61 according to an embodiment.

Figure 18:
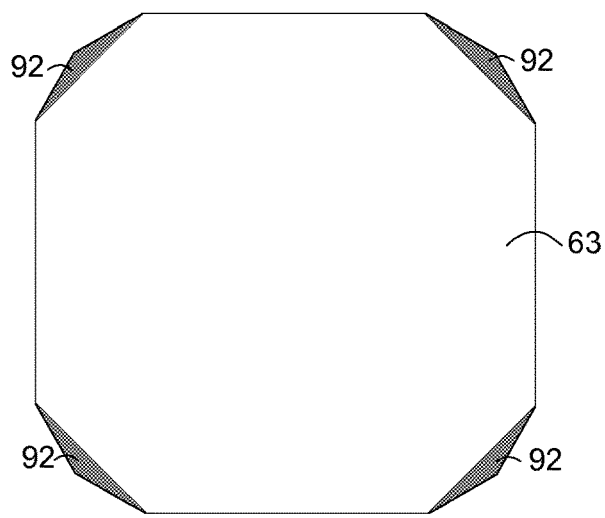
FIGS. 18 and 19 illustrate top and side views, respectively, of a schematic representation of a square conductive base plate comprising four feet produced by bending edges of the conductive base plate according to an embodiment.
Figure 19:
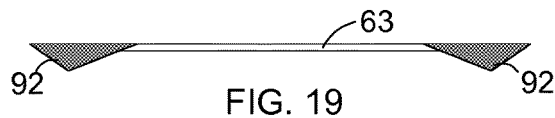

FIGS. 18 and 19 illustrate top and side views, respectively, of a schematic representation of a square conductive base plate 63 comprising four symmetrically positioned feet 92 produced by bending corners of the base plate 63 according to an embodiment.

Figure 20:
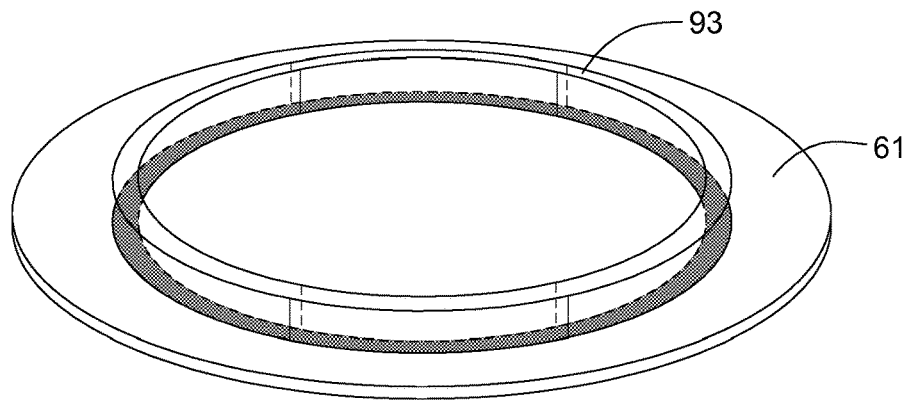
FIG. 20 illustrates a perspective view of a schematic representation of a circular conductive base plate comprising a circular integrated support according to an embodiment.

FIG. 20 illustrates a perspective view of a schematic representation of a circular conductive base plate 61 comprising a unitary circular integrate support 93 according to an embodiment. For ease of illustration, the structure is depicted upside down. Thus, the integrated support is 93 above the base plate 61 in the figure, while in an operating device the integrated support 93 is below the base plate 61. The integrated support 93 can be manufactured separately from the conductive base plate 61 and the fastened to an underside of the conductive support plate 61. The fastening can be done using, for example, an adhesive or welding. Height of the integrated support 93 is configured to be such that over bending of the piezoelectric element 8 is prevented while still permitting sufficient movement for haptic feedback and touch sensing.

Figure 21:
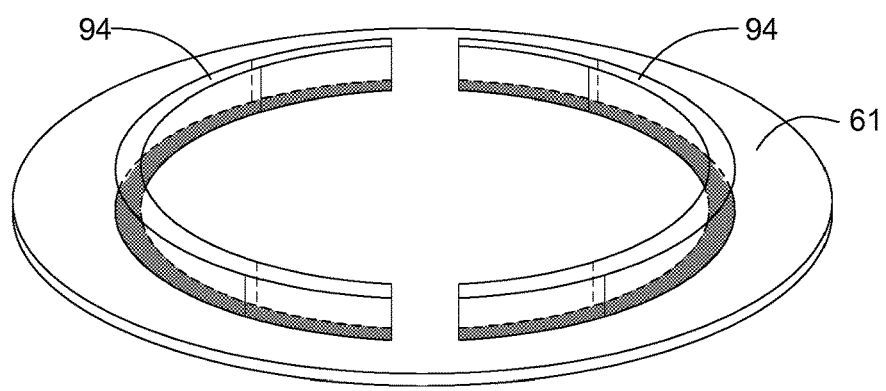
FIG. 21 illustrates a perspective view of a schematic representation of a circular conductive base plate comprising an integrated support comprising two semi-circular support structures according to an embodiment.

FIG. 21 illustrates a perspective view of a schematic representation of a circular conductive base plate 61 comprising an integrated support comprising two semi-circular structures 94 according to an embodiment. Like in the previous figure, the structure is depicted upside down. The semi-circular structures 94 are fastened symmetrically to an underside of the conductive support plate 61.

Figure 22:
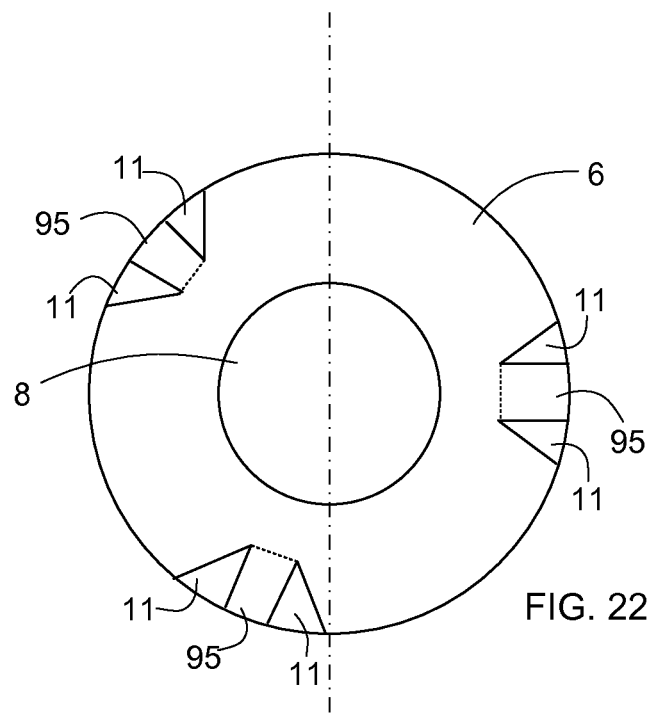
FIGS. 22 and 23 illustrate top and side views, respectively, of a schematic representation of a circular conductive base plate comprising three feet produced by cutting and bending the edges of the conductive base plate according to an embodiment.
Figure 23:
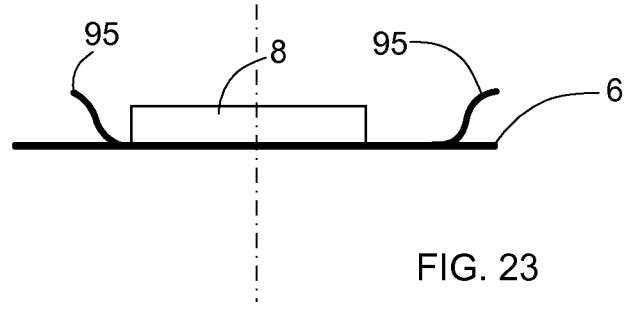

FIGS. 22 and 23 illustrate top and side views, respectively, of a schematic representation of a circular conductive base plate 6 comprising integrated supports 9 produced by cutting and bending the edges of the conductive base plate 6 according to an embodiment. The conductive base plate 6 is circular in the embodiment. It should be noted that oval or other kind of shapes may be used as well. A piezoelectric element 8 is located at a centre of the conductive base plate 6. The integrated support 9 is implemented by for example punching, which results in feet 95 and cuttings 11. The feet 95 may be bent to form a spring contact as, for example, illustrated in FIG. 23. By the spring contact feet 95, the conductive plate 6 may be also connected to the general conductive foil 51 (not shown in FIGS. 22 and 23). The spring contact feet 95 may extend above the height of the piezoelectric element 8. The spring contact feet 95 act as the integrated support 9. The integrated support 9 of FIGS. 22 and 23 may supports from the same side than the piezoelectric element 8.

Figure 24:
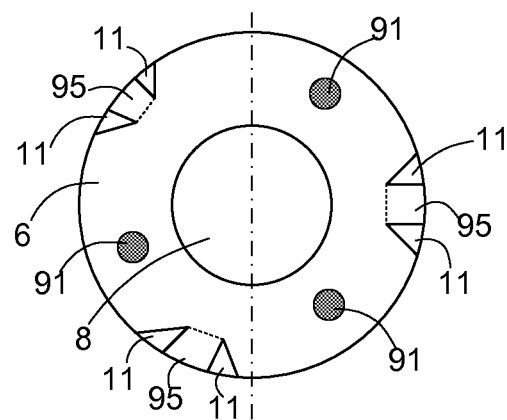
FIGS. 24 and 25 illustrate top and side views, respectively, of a schematic representation of a circular conductive base plate comprising both three feet produced using punching and three feet produced by cutting and bending the edges of the conductive base plate according to an embodiment.
Figure 25:
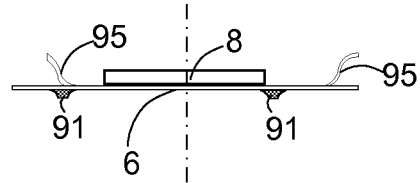

FIGS. 24 and 25 illustrate top and side views, respectively, of a schematic representation of a circular conductive base plate 6 comprising both three feet 91 produced using punching and three feet 95 produced by cutting and bending the edges of the conductive base plate 6 according to an embodiment. The integrated supports 9 of FIGS. 24 and 25 may support from both sides of the piezoelectric element 8, under and above.

Figure 26:
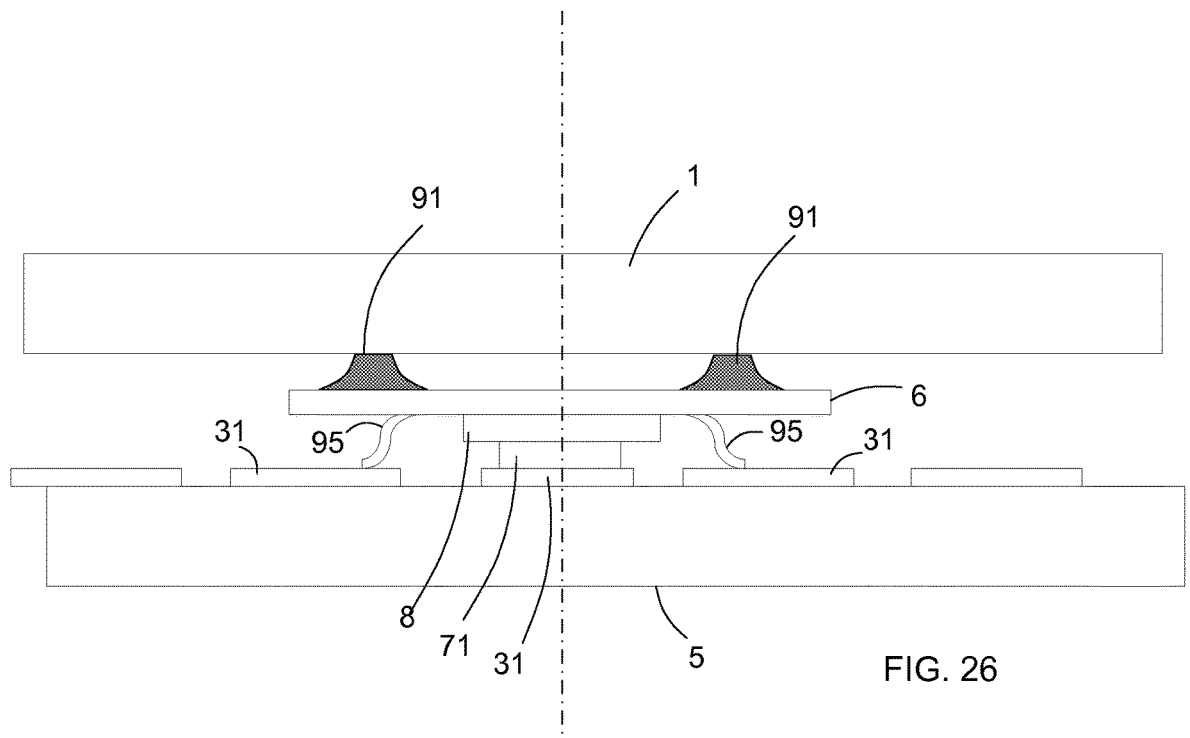
FIG. 26 illustrates a side view of a schematic representation of a device having a conductive base place positioned upside down in comparison to FIG. 1 according to an embodiment.

FIG. 26 illustrates a side view of a schematic representation of a device, wherein a conductive base plate 6 is configured upside down in comparison to FIG. 1 according to an embodiment. The conductive base plate 6 has the spring contact feet 95. With the feet 95 the conductive base plate 6 can be positioned upside down comparted to the embodiment of FIG. 1 and certain FIGs described above. The device stack comprises an overlay 1, a conductive base plate 6 having the integrated supports 9 such as the feet 91 and 95, a piezoelectric element 8, a solder 71, printed circuit board, PCB 31, and a carrier layer 5. The PCB 31 may alternatively be flexible circuit board, FPC or a conductive foil. The conductive spring contact feet 95 connects directly to the PCB 31. Consequently, the conductive base plate 6 can be electrically connected to the PCB 31. Furthermore, the solder connects the piezoelectric element 8 to the conductive foils. The feet 91 support the conductive base plate 6 to the overlay 1. The feet 95 support the conductive baseplate 6 to the carrier layer 5 by the conductive foils 31. Height of the spring contact feet 95 is configured so that the height of the solder 71 and the piezoelectric element 8 correspondences with each other. Consequently, both the feet 95 and solder 71 can contact the surface of the PCB 31.

In the embodiment of FIG. 26 the piezoelectric element 8 is turned upside down in the device stack. The ceramics, for example the carrier layer 5 is under and a carrier plate, for example the overlay 1, is on top. The embodiment of FIG. 26 may enable using the piezoelectric element 8 in a surface mounted technology, SMT, process. It can improve the manufacturability of the piezoelectric device.

Figure 27:
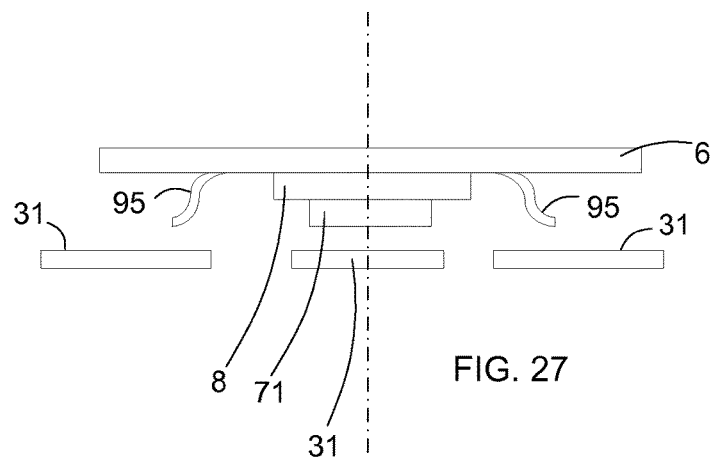
FIG. 27 illustrates a side view of a schematic representation of a solder process for manufacturing the device according to an embodiment.

FIG. 27 illustrates a side view of a schematic representation of a solder process for manufacturing the piezoelectric device according to an embodiment. The conductive base plate 6 comprising the attached piezoelectric element 8 may be appropriately positioned via the spring contact feet 95. When the position is desired, the solder may be applied to attach the conductive base plate 6 onto the ceramics. SMT process may be used in manufacturing process. This may improve the manufacturability of the piezoelectric device.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

When describing structure of the embodiments of the device, directional terms, such as above, below, on, underside, top, and bottom, are used only to easily refer to the relative placement of different components of the device in the orientation the device is depicted in the corresponding drawings. This should not be interpreted as limiting in which orientations the device can operate. If the device is oriented differently from what is presented in the drawings, the relative directional terms change also.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
a piezoelectric element configured to convert an electrical voltage into a mechanical strain, wherein an electrode is fastened to a top surface of the piezoelectric element;
a conductive base plate onto which the piezoelectric element is fastened, wherein the conductive base plate is configured as a lower electrode of the piezoelectric element,
wherein the conductive base plate comprises an integrated support positioned on an underside of the conductive base plate, wherein the integrated support is formed into the conductive base plate by punching or by bending edges of the conductive base plate; and
a carrier layer, wherein the conductive base plate lies on the carrier layer and the conductive base plate is supported by the integrated support;
wherein the device is configured to provide haptic feedback on a basis of the mechanical strain.

2. The device of claim 1, wherein the mechanical strain caused by the voltage bends the piezoelectric element and the conductive base plate.

3. The device of claim 1, wherein the piezoelectric element comprises multiple piezoelectric layers configured electrically either in series or in parallel.

4. The device of claim 1, wherein the piezoelectric element or the conductive base plate is a circular or an oval disk.

5. The device of claim 1, wherein the piezoelectric element or the conductive base plate is a polygon shaped disk.

6. The device of claim 1, wherein the integrated support is positioned on an outer circumference of the conductive base plate.

7. The device of claim 1, wherein the piezoelectric element is configured to convert mechanical strain into electrical voltage to detect touch.

8. The device of claim 1, wherein the piezoelectric element and the conductive base plate are electrically connected to a conductive film.

9. The device of claim 1, wherein height of the integrated support is configured to allow 10-200 micrometre, μm, pre-bending of the piezoelectric element, 10-200 μm haptic movement of the piezoelectric element, and 1-200 μm movement of the piezoelectric element due to touch.

10. The device of claim 1, wherein height of the integrated support is configured so that maximum total bending of the piezoelectric element is limited to a chosen value in a range 200-500 μm.

11. The device of claim 1, wherein the integrated support is configured on a same side than the piezoelectric element.

12. The device of claim 1, wherein the integrated support is configured to be conductive.

13. The device of claim 1, wherein the device further comprises a hermetically sealed cavity, and wherein the piezoelectric element and the conductive base plate are located in the hermetically sealed cavity.

* * * * *